Nov. 27, 1934.　　　A. F. MASURY　　　1,982,115
SPRING SUSPENSION FOR SIX WHEEL VEHICLES
Filed Oct. 14, 1931　　　4 Sheets-Sheet 1
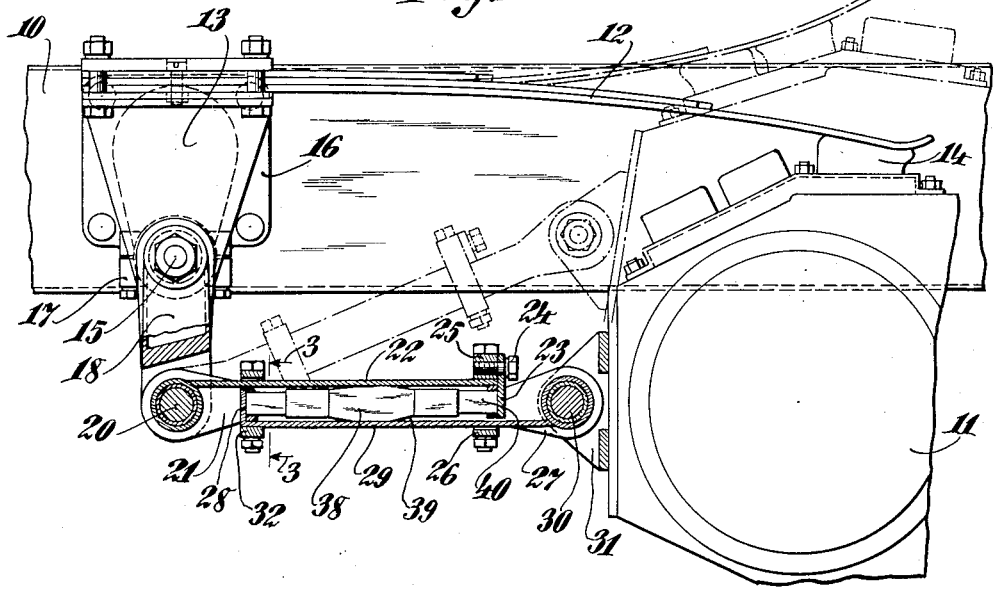
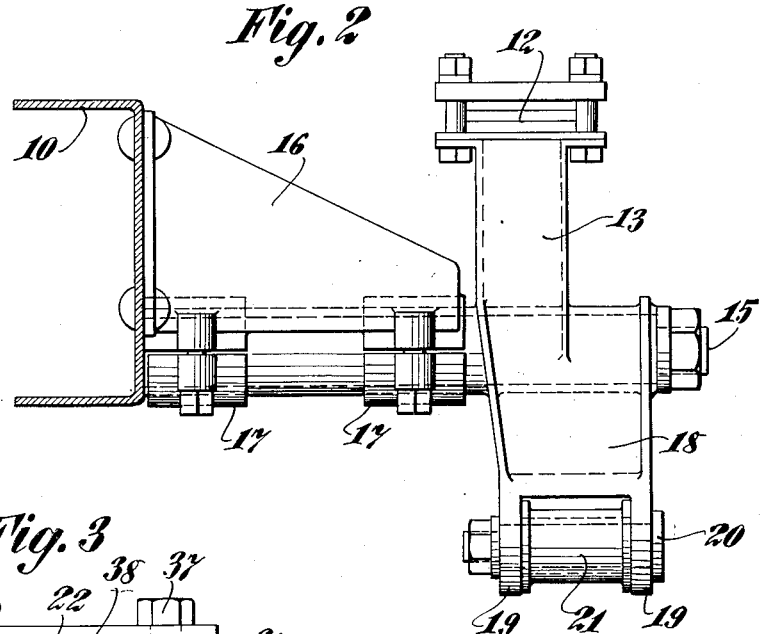
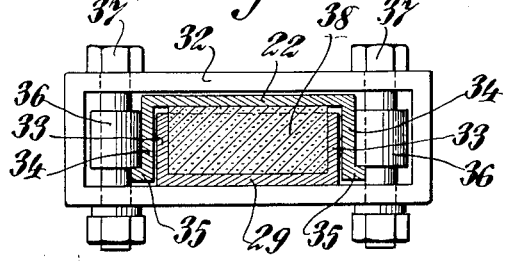
INVENTOR
Alfred F. Masury,
BY
HIS ATTORNEYS Nov. 27, 1934.  A. F. MASURY  1,982,115
SPRING SUSPENSION FOR SIX WHEEL VEHICLES
Filed Oct. 14, 1931  4 Sheets-Sheet 2

INVENTOR
*Alfred F. Masury,*
BY
Redding, Greeley, O'Shea + Campbell
HIS ATTORNEYS Patented Nov. 27, 1934

1,982,115

UNITED STATES PATENT OFFICE 1,982,115

SPRING SUSPENSION FOR SIX WHEEL VEHICLES

Alfred F. Masury, New York, N. Y., assignor to International Motor Company, New York, N. Y., a corporation of Delaware Application October 14, 1931, Serial No. 568,725

4 Claims. (Cl. 280—124)

The present invention relates to spring mountings for motor vehicles and embodies, more specifically, an improved mounting for the wheel unit of a six wheel vehicle wherein two driving wheels are mounted upon either side of a vehicle frame at one end thereof upon a suitable wheel mounting unit.

Where a wheel unit of this character is mounted for rocking movement upon a vehicle frame through a spring suspension of suitable construction, the transverse stresses impressed thereon through the wheels when the latter receive side kicks or other stresses, such as the drag, incident to the turning of the vehicle, the wheel unit frequently is severely strained. To the end that a unit of the above character may be utilized without subjecting the same to deleterious stresses during operation, an object of the present invention is to provide a means for relieving such wheel units from lateral stresses.

A further object of the invention is to provide an improved radius rod construction and connection therefor between an end of a wheel unit and the vehicle frame whereby guiding of the unit may be effected.

Further objects, not specifically enumerated above, will be apparent as the invention is described in greater detail in connection with the accompanying drawings, wherein:

Figure 1 is a view in side elevation, partly broken away and in section showing a wheel unit connected to a vehicle frame.

Figure 2 is a view in end elevation showing the device of Figure 1.

Figure 3 is a view in section, taken on line 3—3 of Figure 1, and looking in the direction of the arrows.

Figure 4:
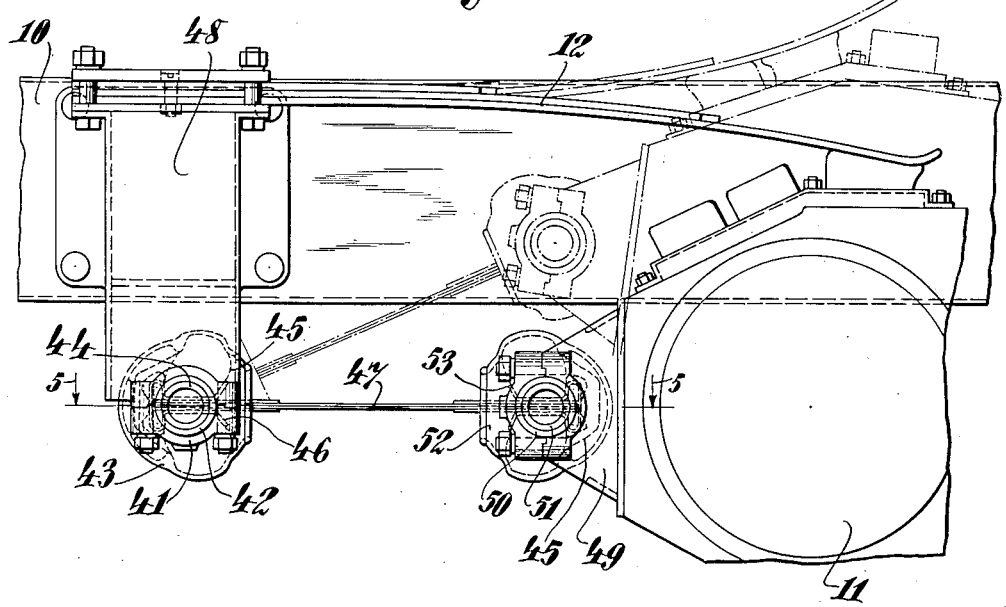
Figure 4 is a view in side elevation, similar to Figure 1, showing the modified form of the invention.

Referring to the above drawings, a frame of a vehicle is indicated at 10 and has mounted thereon in any suitable fashion a rocking wheel unit 11, in the ends of which wheels are adapted to be journaled. The drive to these wheels may be transmitted through the unit in any approved fashion and, if desired, an auxiliary spring 12 may be mounted on the frame 10 by means of brackets 13 and 16. One end of each auxiliary spring is preferably anchored in the bracket 13 and the other end adapted to engage blocks of yielding non-metallic material 14.

The bracket 13 is preferably secured upon a pin 15 which is coupled to a bracket 16 by means of clamps 17. The bracket 13 is further provided with a downwardly extending portion 18 having a bifurcated extension 19 between which bifurcations a pin 20 is secured. Upon pin 20 an arm 21 is journaled, the arm being formed with a top horizontal portion 22 and an end portion 23 which may be secured thereto by means of bolts 24. Bolts 24 engage a boss 25 which is secured to the arm 22 and this boss carries a retaining ring 26 which is adapted to maintain an arm 27 in operative relation with respect to the arm 21. Arm 27 is adapted to telescope with the ring 26 and is formed with an end wall 28 and a longitudinal bottom wall 29.

One end of arm 27 is journaled upon a pin 30 which is carried by a bracket 31, secured to an end of the wheel unit 11. The distant end of arm 27 has secured thereto a ring 32 through which the end of the upper arm 21 extends. The lower arm 27 is formed with side walls 33 while the upper arm 21 is formed with side walls 34 which are adapted to overlie the walls 33. Horizontal flanges 35 are formed on the walls 34 and are adapted to engage under rollers 36 which are mounted upon bolts 37, secured between the opposite sides of each of the rings 25 and 32.

Between the top and bottom walls of the respective arms and the side walls 33, a block of yielding non-metallic material 38 is mounted, the blocks preferably being wider intermediate its ends and tapering down as indicated at 39 to engage seating members 40. Upon relative elongation of the arms 21 and 27, the block of yielding non-metallic material 38 is compressed and the tapered sides thereof flow outwardly to engage the top and bottom, as well as side walls of the arms. In this fashion, elongation of the arms in a vertical plane is permitted but movement in a horizontal plane prevented thus effectively guiding the wheel unit 11.

Figure 5:
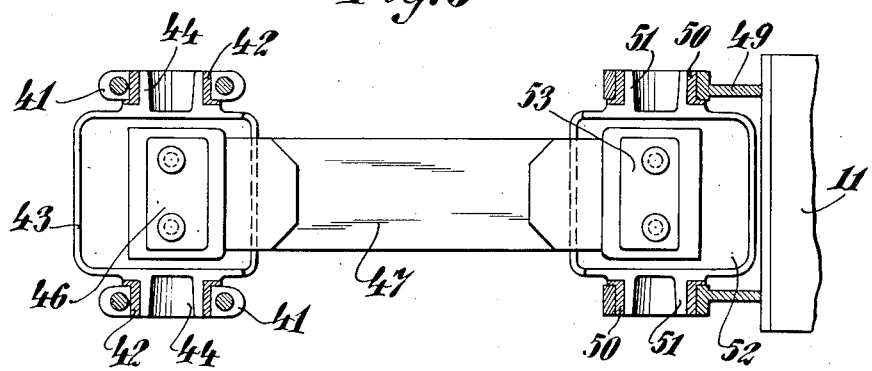
Figure 5 is a view in section, taken on line 5—5 of Figure 4, and looking in the direction of the arrows.

In the construction shown in Figures 4 and 5, the frame 10 carries a bracket 48 within which spring 12 is mounted, as described in connection with the construction shown in Figures 1, 2, and 3. The lower end of the bracket 48 is formed with spaced clamping members 41 within which bearings 42 are secured. Between the spaced clamping members a housing 43 is mounted, the housing being provided with oppositely extending trunnions 44 to engage the bearings 42. Within the housing a block of yielding non-metallic material 45 is mounted, the block being adapted to engage the seat 46 of a connecting link 47. Link 47 is thus pivoted about the axis of the trunnions 44 and may move in a vertical plane.

Upon the wheel unit 11, a bracket 49 is mounted and provided with bearings 50 to receive the trunnions 51 of a housing 52 which is similar in construction to the housing 43. The housing 52 likewise carries a block of yielding non-metallic material 45 and engages a seat 53 which is formed on the cooperating end of the band or strap 47.

Figure 6:
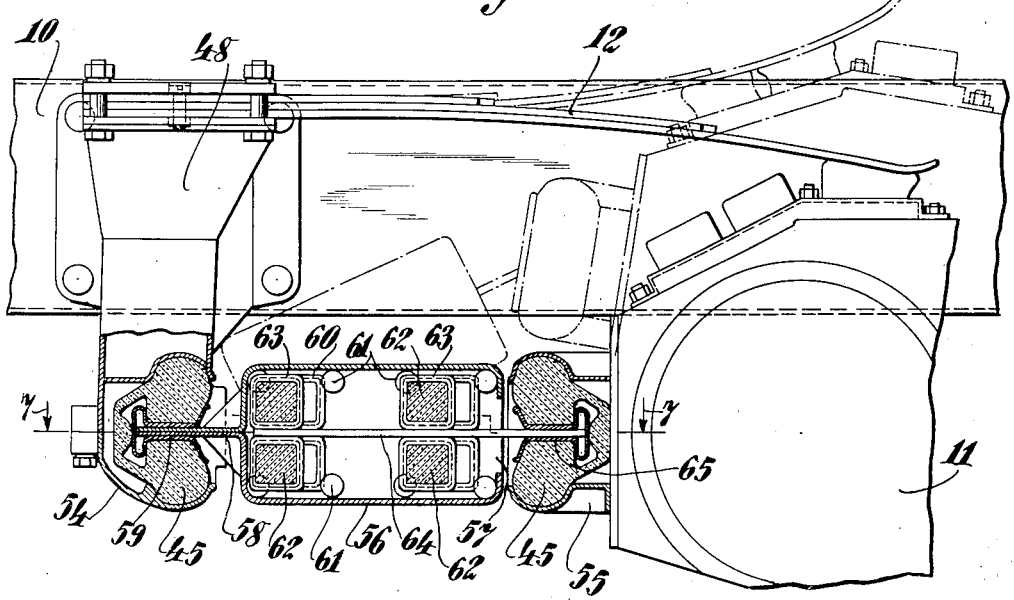
Figure 6 is a view in elevation, similar to Figure 1, and showing a modified form of the invention.
Figure 7:
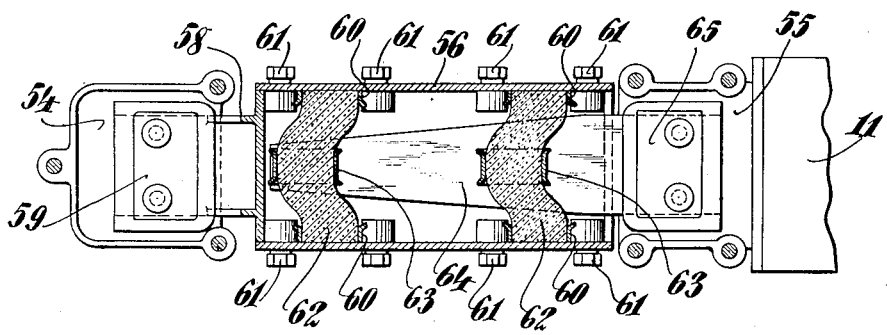
Figure 7 is a view in section, taken on line 7—7 of Figure 6, and looking in the direction of the arrows.
Figure 8:
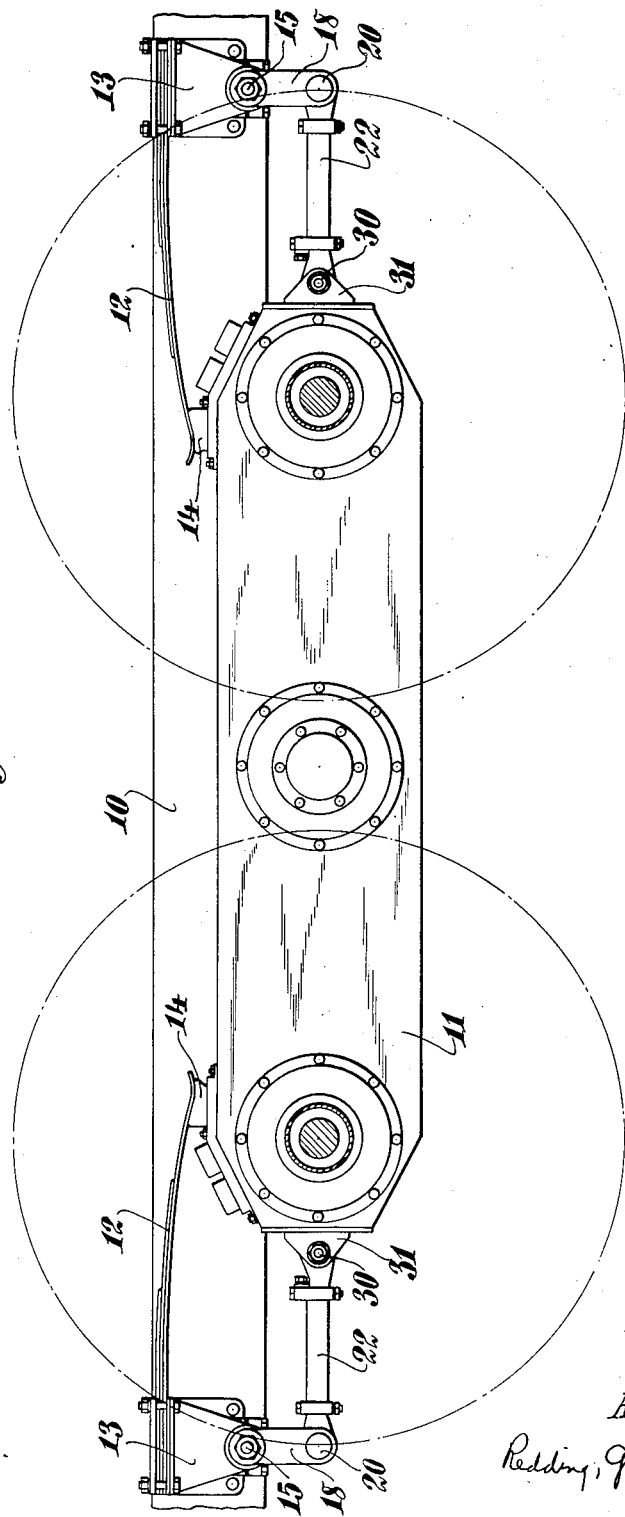
Figure 8 is a view in side elevation showing the wheel mounting member and associated elements constructed in accordance with the present invention.

In the construction shown in Figures 6 and 7, bracket 48 is provided with a stationary split housing 54 within which the block of yielding non-metallic material 45 is secured. In a similar fashion, the wheel unit carries a relatively fixed housing 55 within which the block of yielding non-metallic material 45 is secured. A housing 56, open at 57, at one end thereof, is formed with an arm 58 upon which a seat 59 is formed to engage the left hand block 45. Within the housing 56, spaced seats 60 are secured by means of bolts 61, in the present form, one pair of these spaced seats is being shown at each end and upon opposite sides of the housing 56. Between the opposed pairs of spaced seats 60, columns of rubber 62 are mounted, these columns preferably being under compression and passing through rings 63, as shown in Figure 7. The compression of the columns 62 is sufficient to cause their deflection in such fashion as to resist separation of housing 56 from an arm 64 which is formed with a seat 65 engaged by the right hand block of yielding non-metallic material 45 in the housing 55. Arm 64 is secured to each of the rings 63 and thus the elongation of the housing 56 and arm 64 is yieldingly resisted.

From the foregoing it will be seen that means has been provided to exert an effective steering force upon the wheel unit, the construction being of such character as to additionally serve, in a measure, as an auxiliary spring for the unit.

While the invention has been described with specific reference to the accompanying drawings, it is not to be limited, save as defined in the appended claims.

I claim as my invention:

1. In combination with a vehicle frame and a wheel unit mounted intermediate its ends thereon, housings journaled on the frame and unit, yielding non-metallic material in the housings, and a non-yielding tension member secured at its ends in the yielding material.

2. In combination with a vehicle frame and a wheel unit mounted intermediate its ends thereon, a link between one end of the unit and the frame, housings receiving the ends of the link, trunnion bearings between the housings and the frame and unit, respectively, and yielding non-metallic material in the housings engaging the ends of the link.

3. In combination with a vehicle frame and an independent wheel unit mounted independently intermediate its ends at one side of the vehicle frame for independent rocking movement and having wheels mounted at the ends thereof, a connecting member secured to the frame, a cooperating member secured to the unit, said members being secured to prevent lateral displacement, and yielding non-metallic means between the members to cushion relative movement therebetween.

4. In combination with a vehicle frame and an independent wheel unit mounted independently intermediate its ends thereon, a connecting member secured to the frame, a cooperating member secured to the unit, one of said members forming a housing and the other lying within the housing, opposed seats between the ends of the members, means to secure the members together slidably, and a block of yielding non-metallic material in the housing.

ALFRED F. MASURY.